June 23, 1942.  R. R. KEMMERER  2,287,108

RAILWAY TRAFFIC CONTROLLING APPARATUS

Original Filed May 11, 1940  7 Sheets-Sheet 7

Fig. 8.

INVENTOR.
Ralph R. Kemmerer.
BY
His Attorney.

Patented June 23, 1942

2,287,108

UNITED STATES PATENT OFFICE 2,287,108

RAILWAY TRAFFIC CONTROLLING APPARATUS

Ralph R. Kemmerer, Swissvale, Pa., assignor to The Union Switch & Signal Company, Swissvale, Pa., a corporation of Pennsylvania Original application May 11, 1940, Serial No. 334,610. Divided and this application January 7, 1941, Serial No. 373,444

12 Claims. (Cl. 246—63)

My invention relates to railway traffic controlling apparatus, and it has particular reference to the organization of such apparatus into railway signaling systems of the class wherein coded trackway energy is utilized to control either or both wayside signals and train-carried cab signals.

This application is a division of my copending application, Serial No. 334,610 filed on May 11, 1940, for Railway traffic controlling apparatus, now Patent No. 2,261,388 granted on November 4, 1941.

It has been proposed heretofore in code signaling systems utilizing trackway energy of the frequency code type, to employ a plurality of distinctive code frequencies or rates one for each of the several indications to be controlled or displayed. Such systems also employ a plurality of code distinguishing or decoding units one for each of the different rates of coding but one, with the result that as the number of individual frequencies employed is increased in order to obtain an increased number of signal controls or indications, a corresponding increase must be made in the number of decoding units employed. This has limited to a considerable extent the number of indications provided by both the wayside and cab signal equipment, since it has been thought inadvisable to employ too numerous decoding units because of their relatively large cost of manufacture. In addition, the number of code frequencies available practicably for use is somewhat limited since relatively high rate codes are unsatisfactory because of the necessity of constructing code following relays which mechanically follow each individual code period. As a result of the factors mentioned above, it has been thought advisable to limit code wayside and cab signaling systems to but relatively few indications, thereby requiring the use of only a few individual code rates.

In view of the above-mentioned and other important considerations, it is an object of my present invention to provide novel and improved railway traffic controlling apparatus wherewith an increased number of controls may be effected through the medium of the customary few individual code rates.

Another object of my invention is the provision of railway traffic controlling apparatus incorporating novel and improved means selectively operated by each of a plurality of distinctive codes of trackway energy constituted by coding the supply of such energy either individually at one or another of the customary few code rates or in combinations of two of such code rates repeated alternately.

A further object of my invention is to incorporate such code responsive means into railway traffic controlling apparatus in such manner that a combination of two code rates is utilized to provide a distinctive indication relating to fixed or permanent track hazards that require a reduction in speed permitted over the stretch.

A still further object of my invention is the provision of novel and improved means controlled by traffic conditions in a portion of a section for modifying or changing the code supplied to the rails of the section.

Another object of my invention is the organization of railway traffic controlling apparatus into novel and improved forms of railway signaling systems.

The above-mentioned objects, as well as other important objects and characteristic features of my invention which will become readily apparent from the following description, are attained by supplying to the rails of a trackway one or another of a plurality of different codes each of which is constituted by coding the supply of trackway energy either at one or another of the usual code rates individually or at first one and then another of two of such code rates alternately. In addition, railway traffic controlling apparatus is employed in which a plurality of code distinguishing or decoding units, one for each of the different individual rates of coding but one, are provided with additional means for detecting a combination of two code rates supplied alternately, and such additional means and the decoding units cooperate in selectively controlling train governing devices such as wayside signals and cab signals.

The invention further consists in the parts and in the arrangement and organization of such parts into railway signaling systems, as will be described more fully hereinafter.

I shall describe a few forms of apparatus embodying my invention, and shall then point out the novel features thereof in claims.

In the accompanying drawings, Figs. 1a and 1b, when placed end to end with Fig. 1a on the left, constitute a diagrammatic view illustrating a preferred form of apparatus embodying my invention.

Similar reference characters refer to similar parts in each of the several views.

Figure 1A:
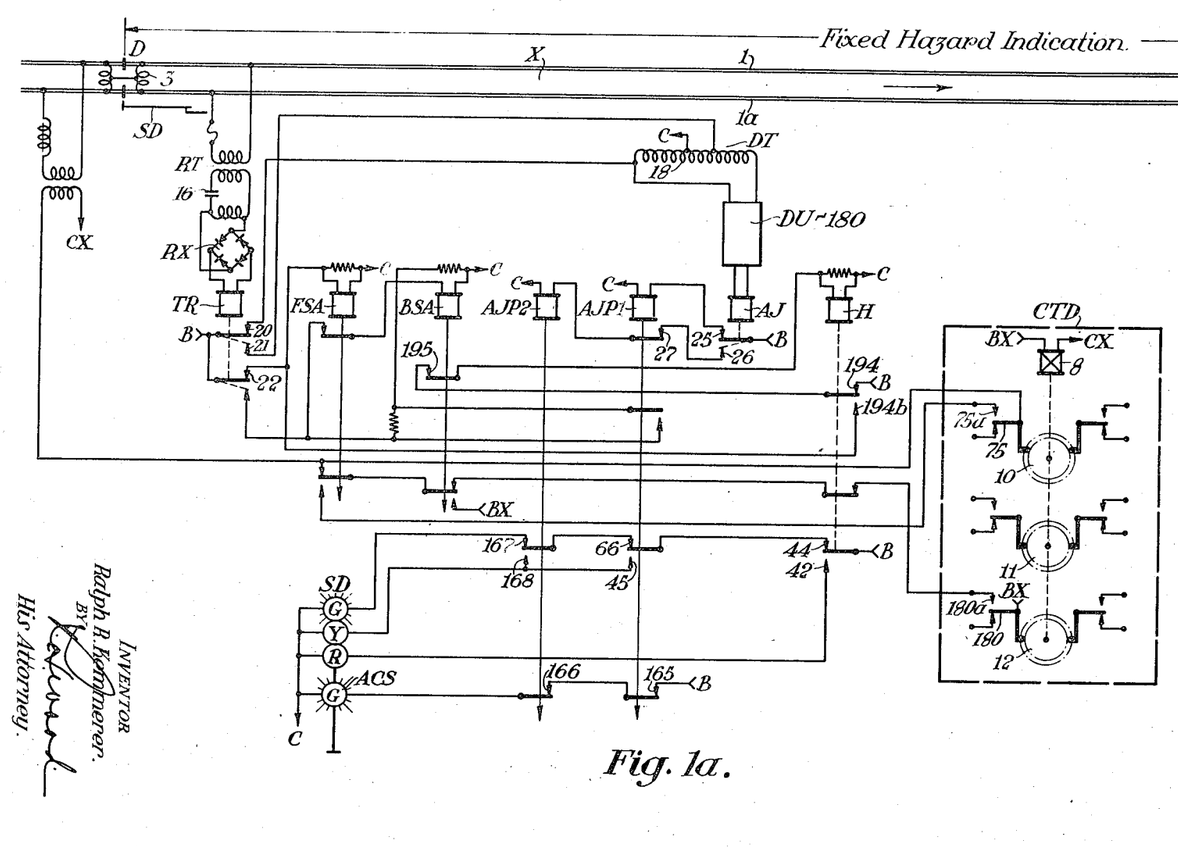
Figure 1B:
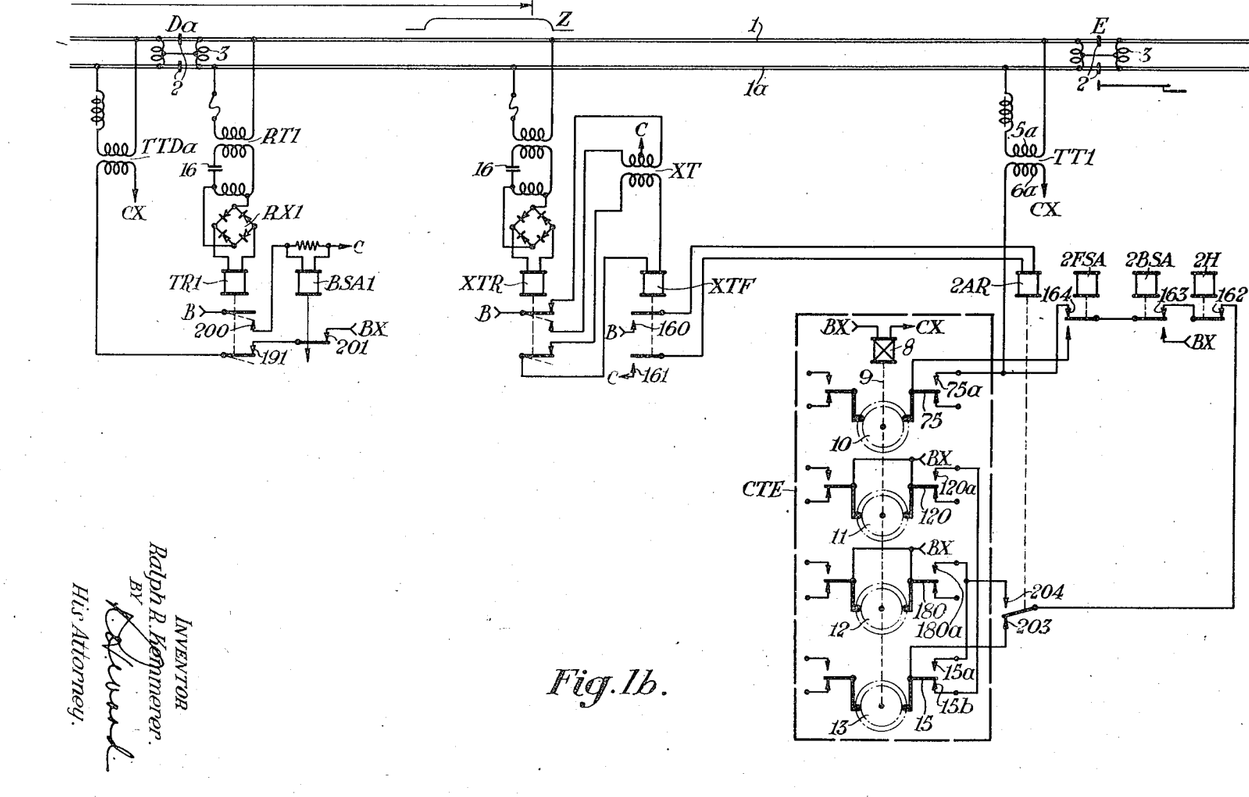

Referring first to Fig. 1, the reference character X designates a stretch of electrified railway track over which traffic normally moves in the direction indicated by an arrow, or from left to right as viewed in the drawings. The stretch of track X is divided by means of the usual insulated rail joints 2 into a plurality of successive adjoining track sections of which only one section D—E is illustrated. Section D—E is further divided by insulated joints 2 at Da into two subsections D—Da and Da—E, and located at each pair of insulated joints 2 is an impedance bond 3, provided in the customary manner to enable the rails to form a portion of the return path of electric propulsion current. As represented in the drawings, associated at E intermediate the ends of section D—E is a fixed track hazard at which a speed not exceeding a certain prescribed speed is permitted. The fixed track hazard may, for example, comprise a curve, cut, fill, tunnel, bridge or the like which requires trains operating thereover to reduce from the maximum speed.

Section D—E is provided adjacent its entrance end D with a multiple indication traffic controlling signal SD. This signal may be of any desired type and as shown is a color light signal comprising three lamps G, Y and R, which lamps when illuminated indicate "clear," "caution" and "stop," respectively. An auxiliary signal ACS is associated with signal SD for indicating the presence of the fixed hazard along the track.

Each section of track X is provided with trackway apparatus of the type required for a combined wayside and cab signal system. Section D—E, for example, is provided with a track circuit, the rails of which are supplied with trackway energy through the medium of a track transformer TT1 which has its secondary winding 5a connected across such rails adjacent the exit end E of the section. The primary winding 6a of transformer TT1 is connected with trackway code transmitting means located at location E, whereby as will be pointed out presently in detail, the rails of the section are supplied with one or another of a plurality of codes, which codes are constituted by coding energy supplied to the trackway at one or another of a plurality of code rates individually or at first one and then another of two of such code rates alternately. I shall designate as individual codes those constituted by coding the supply of energy individually at one or another of the plurality of code rates, and shall designate as a combination code that constituted by coding the supply of energy alternately at first one and then another of two of such code rates. For example, it is customary in railway signaling to employ alternating current coded or periodically interrupted at the rates of 75, 120 and 180 times per minute and I shall use by the way of illustration in describing apparatus embodying my invention such code rates as the individual codes. A combination code is constituted by cyclically using at least two of such rates alternately. Thus a combination code would be constituted by supplying current coded at the 180 code rate for a predetermined interval such as two seconds and then coded at the 120 core rate for two seconds and this combination cyclically repeated. As will be made clear presently, the trackway code transmitting means located at signal location E for supplying energy to primary winding 6a of transformer TT1 is controlled by traffic conditions in advance of section D—E, by apparatus substantially corresponding to decoding apparatus hereinafter described and located at signal location D.

The trackway code transmitting apparatus associated with each section comprises a suitable source of alternating current having a frequency of, say, 100 cycles per second, and which source may for example comprise a generator not shown but having its opposite terminals designated by the reference characters BX and CX, a coding device or transmitter, designated by the reference character CT with a suitably distinguishing suffix, having a plurality of continuously operating contact members, and a plurality of circuits controlled by decoding apparatus associated with the section next in advance and later to be described in detail, and by means of which circuits energy from the source is supplied to the track rails of the associated section.

The code transmitters CT may be of any suitable type and coder CTE is shown, for example, as being of the type having a motor 8 which is constantly supplied with alternating current so that the transmitter is continuously active. Motor 8 is operatively connected with a rotatable shaft 9, indicated by a dotted line, upon which are secured a plurality of cams 10, 11, 12 and 13. The shaft 9 is arranged to revolve in response to the actuation of motor 8, in a counterclockwise direction at a constant rate, say at 15 revolutions per minute, thereby causing the cams mounted thereon to revolve in a counterclockwise direction. Each of the cams is provided in the usual manner with a different number of teeth or projections. For example, cam 10 may be provided with five teeth, cam 11 with eigth teeth, cam 12 with twelve teeth, and cam 13 with but one tooth or projection. Transmitter CTE further comprises a plurality of code contact members, one member 75 of which is associated with cam 10, the arrangement being such that contact member 75 is actuated by each tooth of the cam to close contact 75—75a, and to open such contact between successive teeth. Similarly, a contact member 120 associated with cam 11 is actuated by each tooth of cam 11 and closes a contact 120—120a, which contact is opened between successive teeth of the cam. Cam 12 also is provided with a contact member 180 which is engaged by each tooth of the cam to close a contact 180—180a, this contact being opened between successive teeth. Cam 13 is provided with a contact member 15 which is engaged by the single projection on the cam to close a contact 15—15a during one-half of each revolution of the cam, and which member closes another contact 15—15c when such member rides on the low or unprojecting portion of the cam during the other half of each revolution of the cam. It follows, therefore, that with the cams constructed in the above assumed manner and with the shaft of device CT revolving at a constant rate of 15 revolutions per minute, contact 75—75a when interposed in a circuit supplied with current periodically interrupts or codes such current at the rate of 75 times per minute; contact 120—120a when interposed in a circuit codes current in the circuit at a rate of 120 times per minute; while contact 180—180a functions when interposed in a circuit to code current therein at the rate of 180 times per minute. The purpose of the contacts 15—15a and 15—15b, which are closed alternately for two second intervals, will be made clear presently.

The track circuit of section D—E includes cut section facilities at cut section location Da for cascading energy from subsection Da—E into subsection D—Da. These facilities, as shown, comprise a track relay TR1 connected through a relay transformer RT1 and rectifier RX1 to the rails of subsection Da—E adjacent the insulated joints 2 at Da; a repeater relay BSA1 energized over an obvious circuit including back contact 200 of relay TR1 and provided with slow releasing characteristics which enable the relay to bridge the "on" intervals of the different code rates; and a track transformer TTDa having its secondary winding connected to the rails of subsection D—Da adjacent cut section location Da and its primary winding connected to the source of alternating current over a circuit extending from terminal BX through front contact 201 of relay BSA1, front contact 191 of relay TR1 and the primary winding of transformer TTDa to terminal CX. The circuit connection of relay TR1 to transformer RT1 is preferably tuned, as by condenser 16, to pass only current corresponding in frequency to the frequency of current supplied to transformer TT1 to the rails of subsection Da—E, and relays TR1 and BSA1 function to cascade coded energy from the advance subsection Da—E into the rear subsection D—Da, as is readily apparent from an inspection of the drawings, but prevent the cascading of steady or non-coded energy from the advance subsection to the adjacent rear subsection. This protection is afforded by virtue of the releasing of relay BSA1 when relay TR1 is held steadily energized by non-coded energy.

The track circuit of section D—E further includes a code responsive track relay TR, which relay is connected through the medium of a relay transformer RT and a rectifier RX to receive energy from the rails 1 and 1a at the entrance end D of section D—E. The winding of relay TR is connected across the output terminals of rectifier RX; the input terminals of this rectifier are connected to the secondary winding of transformer RT and this connection is suitably tuned, as by a condenser 16, to pass only current having a frequency corresponding to the frequency of the current supplied from terminals BX and CX; and the primary winding of transformer RT is connected across the rails of section D—E adjacent entrance end D of the section.

The decoding means previously referred to as being provided at signal location D comprises a decoding transformer DT, a code detecting relay H, a decoding unit DU—180, a code selecting relay AJ, two repeater relays associated with relay AJ, and two "lock-out" relays FSA and BSA.

The decoding transformer DT comprises a winding 18 having a first portion thereof supplied through front contact 20 of relay TR with unidirectional current which flows from a suitable source, such as a battery not shown but having its opposite terminals designated by the reference characters B and C, in one direction in a first portion of the winding and supplied through back contact 21 of relay TR with unidirectional current flowing in the other direction in a second portion of the winding. In this manner is simulated the action of alternating current having a frequency equal to the rate at which relay TR is responding to coded current received from the rails of the section. Winding 18 of transformer DT is connected to relay AJ through the medium of decoding unit DU—180. The details of construction of decoding unit DU—180 are not shown in the drawings, but this unit usually comprises a rectifier and a reactor condenser tuning unit tuned to resonance at a frequency corresponding to the 180 code rate, whereby relay AJ is effectively energized and picked up when and only when relay TR is following 180 code.

The two repeater relays AJP1 and AJP2 associated with relay AJ are each proportioned to have a slow release period slightly longer than two seconds in duration. The first slow release repeater relay AJP1 is energized over an obvious circuit including front contact 25 of relay AJ and hence functions as an ordinary slow release repeater, being energized whenever relay AJ is constantly picked up or whenever relay AJ is picked up and released for alternate two second intervals. The second slow release relay AJP2 is energized over an obvious circuit including back contact 26 of relay AJ and front contact 27 of repeater relay AJP1 and hence functions to detect whether relay AJ is alternately being picked up and released for two-second intervals.

The two "lock-out" relays FSA and BSA are controlled respectively over front contacts and back contacts of relay TR, hence relay FSA functions as a front contact repeater relay and relay BSA functions as a back contact repeater relay of relay TR. The circuit of relay BSA also includes a front contact of relay FSA, and the relays FSA and BSA control in the usual and well-known manner the supply of track way current to the section next in the rear, whereby the rails of the rear section are supplied with coded trackway energy under normal conditions but are supplied with steady or non-coded energy in the event that trackway energy leaks forwardly from the rear section into section D—E to falsely energize relay TR. In this manner, broken-down insulated rail joint protection is obtained for detecting and protecting against false operation due to a failure of a rail joint to insulate the trackway energy of the rear section from the advance section.

Code detecting relay H is also controlled by relay TR over the usual circuit arrangements wherein relay H is picked up over a pick-up circuit which may be traced from terminal B through front contact 22 of relay TR, back contact 194b of relay H, front contact 195 of relay BSA, and the winding of relay H to terminal C. Relay H when picked up over the circuit just traced completes for itself a stick circuit which extends from terminal B through front contact 194 of relay H, front contact 195 of relay BSA and the winding of relay H to terminal C.

As can be seen from an inspection of Figs. 1a and 1b, the location of the fixed hazard in the trackway is such that it is not necessary to maintain a restrictive speed throughout the entire length of section D—E. In consequence, across the rails of the section adjacent the point at which unrestricted speed is permitted, a code following relay XTR is connected through a transformer-rectifier combination, and is provided with an auxiliary relay XTF which it controls through the medium of a transformer XT. Auxiliary relay XTF controls an approach control relay 2AR over an obvious circuit including back contacts 160 and 161 of relay XTF; and relay 2AR in turn controls the supply to the rails of section D—E of the "clear" or 180 code and the fixed hazard indication or combination code formed alternately of repeated intervals of the 180 or "clear" code and another code rate, such as the 120 code rate.

In describing the operation of the apparatus shown in Figs. 1a and 1b, it first should be pointed out that a fixed hazard indication is displayed at signal location D only in the event that an otherwise unrestricted speed would be permissible in section D—E. That is to say, the fixed hazard indication code is supplied only when the section next in advance of section D—E is unoccupied so that but for the presence of the fixed hazard in section D—E, an unrestricted speed would be indicated at signal location D and 180 code would be supplied to the section. However, with a fixed track hazard in the section, the rails thereof normally are supplied with a combined code formed of repeated alternate intervals of the 180 code and another code, over a circuit having two alternate paths one of which passes from terminal BX through contact 180—180a of code transmitter CT and contact 15a—15 of transmitter CT and the other of which passes from terminal BX through contact 120—120a of transmitter CT and contact 15b—15 of transmitter CT, then through back contact 203 of relay 2AR and front contacts 162, 163 and 164 of relays 2H, 2BSA and 2FSA, respectively, provided for the section next in advance, and the primary winding of track transformer TT1 to terminal CX.

With the rails of subsection Da—E supplied with combined 180—120 code, relays TR1 and BSA1 at location Da function to cascade such energy into the rear subsection D—Da and relay TR responds to such energy to cause relay AJ to be alternately picked up and released for two-second intervals. The alternate picking up and releasing of relay AJ causes relays AJP1 and AJP2 to be picked up also, and as a result auxiliary signal ACS is energized over an obvious circuit including front contacts 165 and 166 of relays AJP1 and AJP2, respectively. Also, since relay H is held energized in response to relay TR following code, signal SD is caused to display its clear indication by a simple circuit including front contacts 44, 66 and 167 of relays H, AJP1 and AJP2, respectively.

In the event that a train enters section D—E under the above conditions, relay TR is shunted, relays FSA, BSA, H, AJ, AJP1 and AJP2 release, and lamp R of signal SD becomes energized over an obvious circuit including back contact 42 of relay H. The combined 180—120 code present in the rails of the section is, however, supplied to the train to control suitable train-carried apparatus later to be referred to, until such time as the train passes track hazard location Z at which is positioned relay XTR. When the train is moving between location Z and the exit end of the section, relay XTR is shunted and its code following contacts assume their released positions so that auxiliary relay XTF also releases. The releasing of auxiliary relay XTF completes the previously mentioned circuit for approach control relay 2AR, whereupon the latter relay picks up to close its front contact 204 and thereby establish an obvious circuit whereby the rails of section D—E are supplied with "clear" or 180 code over contact 180—180a of code transmitter CT. This 180 code supplied to the rails of section D—E after the train passes the hazard operates to control the train-carried apparatus later to be referred to, to an indication that permits an increased speed.

When the section in advance of section D—E is occupied by a train and section D—E is unoccupied, relays 2FSA and 2BSA associated with the advance section are released and 75 code current is supplied to the rails of section D—E over a circuit extending from terminal BX through back contact 163b of relay 2BSA, back contact 164b of relay 2FSA, contact 75—75a of coder CTE and the primary winding of transformer TT1 to terminal CX. This 75 code current is cascaded at Da from subsection Da—E into subsection D—Da, and relay TR responds to such current to hold relays FSA, BSA and H energized. Under the assumed conditions, lamp Y of signal SD is energized over an obvious circuit including front contact 44 of relay H and back contact 45 of relay AJP1. It is to be noted that when the apparatus at E is conditioned to supply 75 code current to section D—E, auxiliary relay XTR is ineffective to alter the rate of coding the current supplied to the section, and that 75 code current is supplied regardless of whether approach control relay 2AR is released or picked up.

Figures 2, 6:
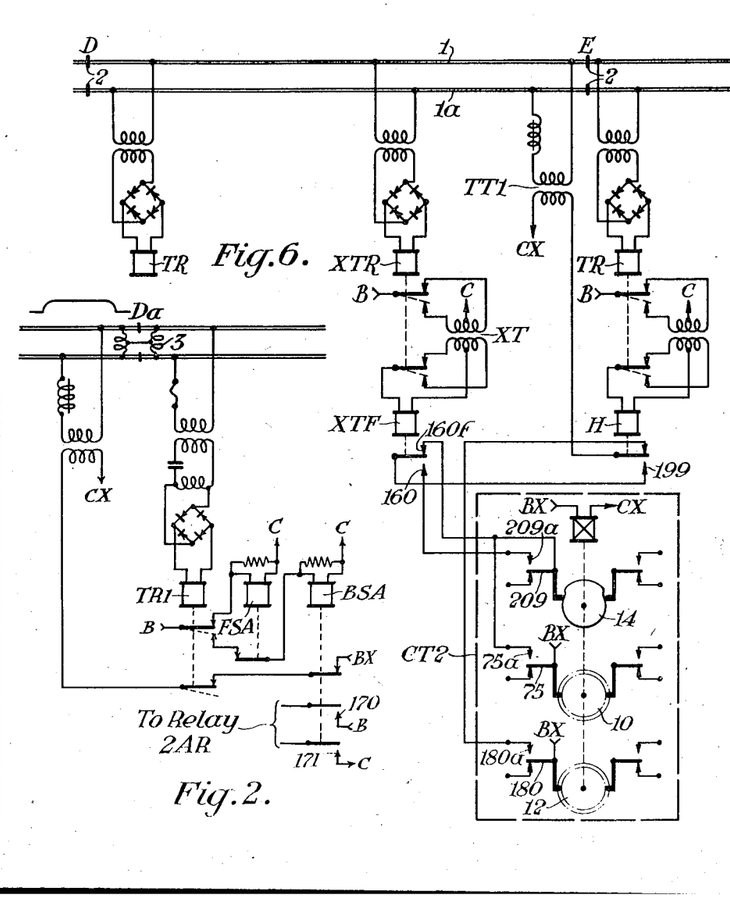
Figs. 2 and 3 are diagrammatic views illustrating modifications of a portion of the apparatus shown in Figs. 1a and 1b, and each also embodies my invention.
Fig. 6 is a diagrammatic view showing a modified form of the apparatus represented in Fig. 5, and also embodying my invention.

Fig. 2 illustrates a modified arrangement of a portion of the apparatus shown in Fig. 1b, in which modified arrangement the cut section location Da is positioned at the point at which resumption of maximum speed is permitted. When cut section facilities are utilized at this point, the usual two lock-out relays BSA and FSA may be utilized to provide not only protection against cascading steady non-coded energy from one subsection to the next, but also to control over back contacts 170 and 171 of relay BSA the approach control relay 2AR shown in Fig. 1b, thereby selecting between supplying 180 or combined 180—120 code in accordance with traffic conditions in subsection Da—E.

Figure 3:
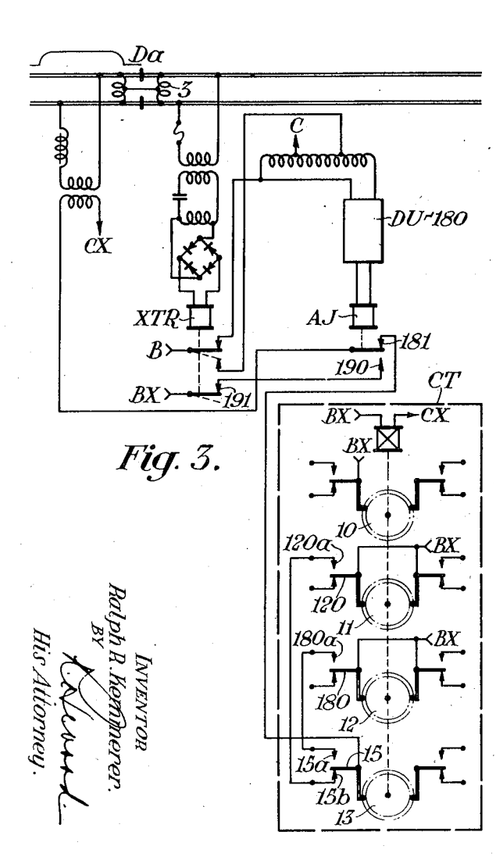

Another modified arrangement of a portion of the apparatus shown in Fig. 1b is illustrated in Fig. 3. In connection with the apparatus of Fig. 1b, the modified arrangement shown in Fig. 3 may be employed to replace the cut section facilities at location Da and the "cut-out" track relay XTR located at fixed hazard location Z, and if this is done, it then is contemplated that the rails of section D—E will be supplied at its exit end with 180 code, which is received by the code following track relay XTR of Fig. 3 and is utilized to control code selecting relay AJ through the medium of decoding unit DU—180. The code selecting relay AJ as shown functions to establish circuits whereby the rear subsection D—Da is supplied with 180—120 code. That is to say, when 180 code is received by relay XTR so that relay AJ is picked up, the rails of the rear subsection are supplied with combined 180—120 code over a circuit passing from terminal BX through contact 180—180a and contact 15a—15 or from terminal BX through contact 120—120a and contact 15b—15 of coder CT, then through front contact 181 of relay AJ and the primary winding of the track transformer of the rear subsection to terminal CX. However, when 75 code is received by relay XTR, then relay AJ is released and completes at its back contact 190 a circuit over which 75 code is supplied to the rear subsection due to relay XTR opening and closing its front contact 191 at a rate corresponding to the code rate of the received trackway energy. In this manner each portion of the section is provided with a particular code of trackway energy representing the indication that is correct to be displayed in such portions respectively.

Figure 4:
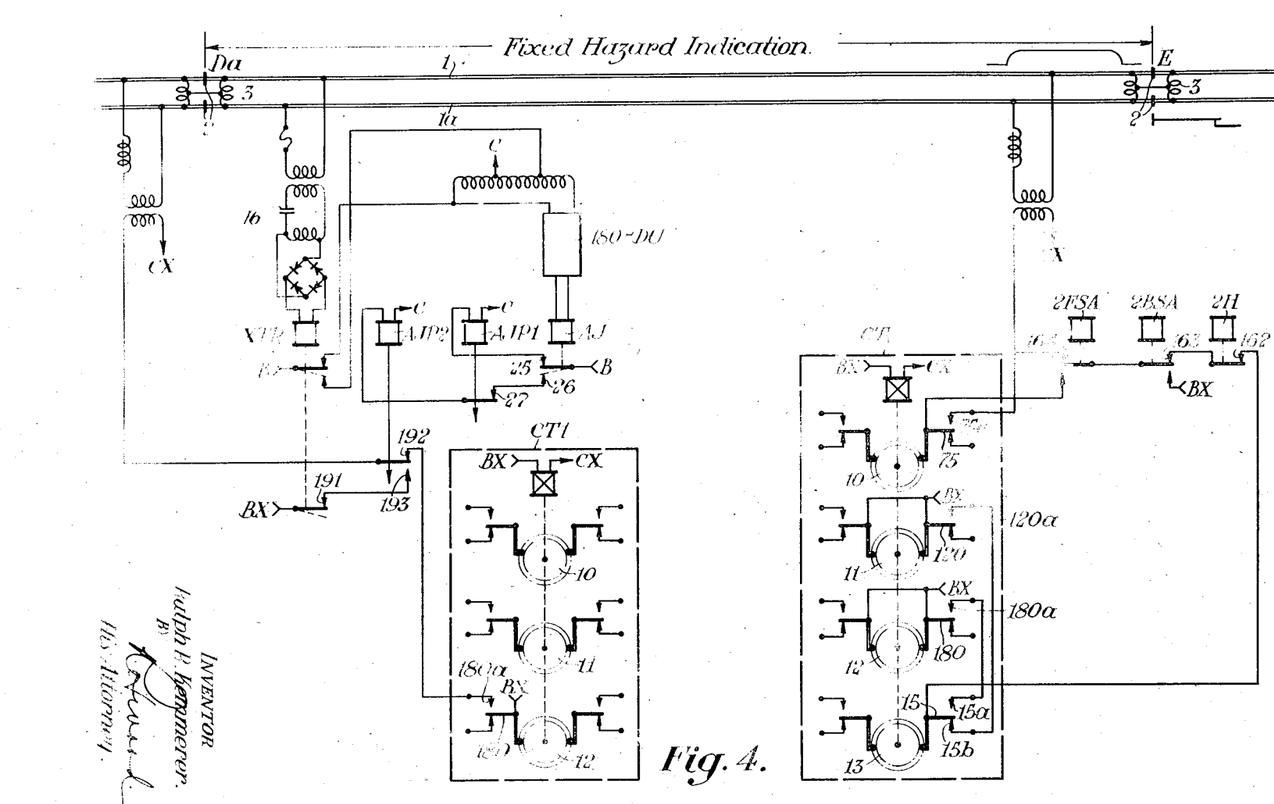
Figs. 4 and 5 are diagrammatic views each showing modified forms of the apparatus illustrated in Figs. 1a and 1b, and which also embody my invention.

Fig. 4 illustrates subsection Da—E having a fixed hazard located adjacent its exit end E. Normally, combined 180—120 code is supplied to the rails of section D—E adjacent its exit end, and is received by a track relay XTR positioned at cut-section location Da located in the rear of the hazard and defining the beginning of the restrictive speed zone for the hazard. Relay XTR has associated therewith an AJ relay and two associated slow releasing relays AJP1 and AJP2, which relays cooperate in controlling circuits whereby a code transmitter CT1 at location Da supplies energy to the rails of the rear subsection. As is readily apparent from an inspection of the drawings, code transmitter CT1 functions to supply only 180 code to the rear subsection when relay AJP2 is picked up in response to relay XTR following combined 180—120 code received from the advance subsection; the 180 code being supplied over a circuit extending from terminal BX through contact 180—180a of coder CT1, front contact 192 of relay AJP2, and the primary winding of the track transformer of the rear subsection to terminal CX. Whenever relay AJP2 is released in response to relay XTR following 75 code, this 75 code is cascaded into the rear subsection over a circuit including front contact 191 of relay XTR and back contact 193 of relay AJP2.

Figure 5:
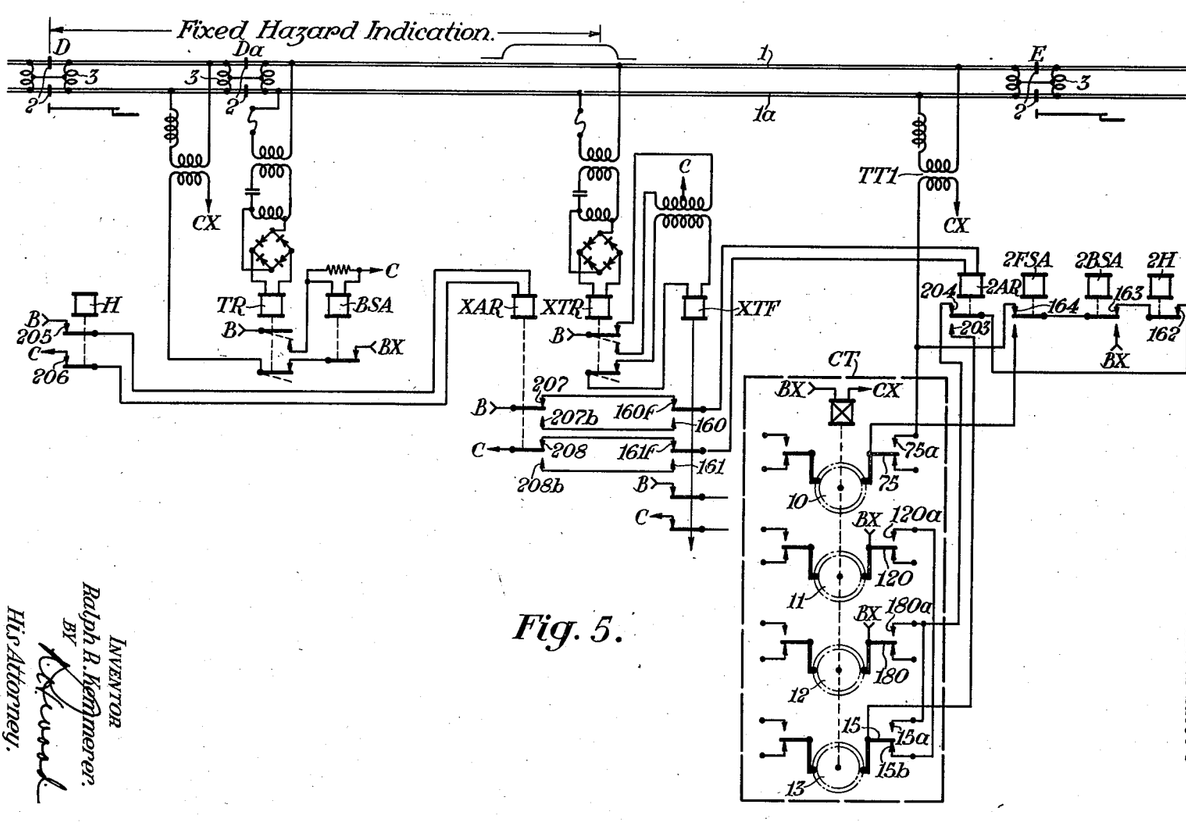

The apparatus illustrated in Fig. 5 illustrates a section of track normally supplied with "clear" or 180 code trackway energy, but provided with means responsive to the presence of a train upon a restrictive speed zone adjacent a hazard for supplying the 180—120 code to the section. The apparatus of Fig. 5 is characterized by the provision of two approach control relays 2AR and XAR, respectively. Relay 2AR is utilized to control the supply of trackway energy to section D—E and the other relay XAR is utilized to control relay 2AR. The relay 2AR is controlled by track relay XTR which is positioned at the point beyond which a restricted speed no longer is required.

In the normal condition of the apparatus of Fig. 5, a code detecting relay H controlled by suitable apparatus, such as is shown in Fig. 1a located adjacent signal location D, is energized to complete an obvious circuit including front contacts 205 and 206 of relay H for approach control relay XAR. With relay XAR energized, relay 2AR also is energized over a circuit extending from terminal B through front contact 207 of relay XAR, front contact 160f of relay XTF, the winding of relay 2AR, front contact 161f and front contact 208 of relay XAR to terminal C. Relay 2AR, energized, establishes a circuit whereby the rails of section D—E are supplied with 180 code trackway energy when clear traffic conditions in advance exist. This circuit may be traced from terminal BX through contact 180—180a of coder CT, front contact 204 of relay 2AR, front contacts 162, 163 and 164 of relays 2H, 2BSA and 2FSA, respectively, of the section next in advance, and the primary winding of transformer TT1 to terminal CX. When, however, section D—E is entered by a train so that relay H releases, relay XAR also releases to cause the release of approach control relay 2AR, whereupon 120—180 code is supplied to section D—E over a circuit which includes back contact 203 of relay 2AR and contact 15—15a of coder CT in series with contact 180—180a of coder CT or contact 15—15b of coder CT in series with contact 120—120a of coder CT.

As the train proceeds through section D—E and advances beyond the hazard, relay XTR is shunted so that auxiliary relay XTF releases to complete through back contacts 207b, 208b and 160, 161 of relays XAR and XTF, respectively, an alternate energizing circuit for relay 2AR, whereupon the latter relay picks up to close its front contact 204 and reestablish the previously traced circuit whereby section D—E is supplied with clear or 180 code.

The operation of the apparatus illustrated in Fig. 5 when 75 code is supplied to section D—E will readily become apparent from an inspection of the drawings, and further detailed explanation is believed to be unnecessary except to point out that approach control relay 2AR does not control the supply of 75 code to section D—E, hence this latter code may be supplied to the section regardless of the position of relay 2AR.

Another modification of the apparatus shown in Figs. 1a and 1b is illustrated in Fig. 6, wherein it is contemplated to approach control the form of trackway energy supplied to the rails of section D—E whereby train-carried apparatus on a train may be controlled to indicate that the train is approaching the end of an "approach" block, that is, that such train is approaching the limits of a block next in the rear of an occupied block. In Fig. 6, a code responsive relay XTR is connected across the rails of the section at the point at which it is desired that the "end-of-block" indication be displayed. Relay XTR controls a repeater relay XTF through the medium of transformer XT in such manner that relay XTF is held energized when relay XTR responds to coded energy received from the rails of the section, and relay XTF is released when a train is interposed between the exit end E of the section (at which trackway energy is supplied) and the location of relay XTR.

The rails of section D—E of Fig. 6 are supplied with "clear" or 180 code over an obvious circuit when the section in advance is unoccupied so that a relay H of such advance section is picked up. When the advance section is occupied and relay H of that section accordingly is released, "approach" or 75 code is supplied to the rails of section D—E normally over a circuit which extends from terminal BX through contact 75—75a of code CT2, front contact 160f of relay XTF, back contact 199 of relay H associated with the section next in advance of section D—E, and the primary winding of transformer TT1 to terminal CX. If, however, with relay H of the section in advance released, a train in section D—E advances beyond the location of relay XTR and shunts that relay to cause the release of relay XTF, the just traced normal circuit of the "approach" code is opened and such code is supplied to the rails of section D—E over an alternate circuit which may be traced from terminal BX through contact 75—75a of coder CT2, contact 209—209a of coder CT2, back contact 160 of relay XTF, back contact 199 of relay H and the primary winding of transformer TT1 to terminal CX. The "approach" or 75 code supplied over the above-traced alternate circuit is modulated in a distinctive manner by the action of cam 14 of coder CT2, which cam as shown is provided with one tooth or projection which engages its associated contact member 209 to close contact 209—209a during two-fifths of the revolution of cam 14. When contact member 209 is not engaged by the projection of cam 14 (during the remaining three-fifths of each revolution of the cam), contact 209—209a is opened. It can be seen, therefore, that when relay XTF is released to interpose contact 209—209a of coder CT2 in the circuit over which "approach" or 75 code is supplied to section D—E, contact 209—209a functions to modulate such code by periodically interrupting and completing the circuit over which such code is supplied to section D—E, so that as a result the rails of section D—E are provided with short intervals of 75 code separated by somewhat longer intervals during which no code is supplied to the section. It is readily apparent that if the train in section D—E is provided with the customary train-carried code responsive apparatus for controlling a cab signal, such, for example, as is shown in United States Letters Patent No. 1,986,679 granted on January 1, 1935, to Lloyd V. Lewis, such "modulated" 75 code will cause the train-carried apparatus alternately to energize the particular cab signal indications that correspond respectively with the 75 and the "no-energy" code conditions in the trackway, thereby causing the cab signal to display distinctive flashing indications to denote that the train is nearing the end of the "approach" block.

Figure 7:
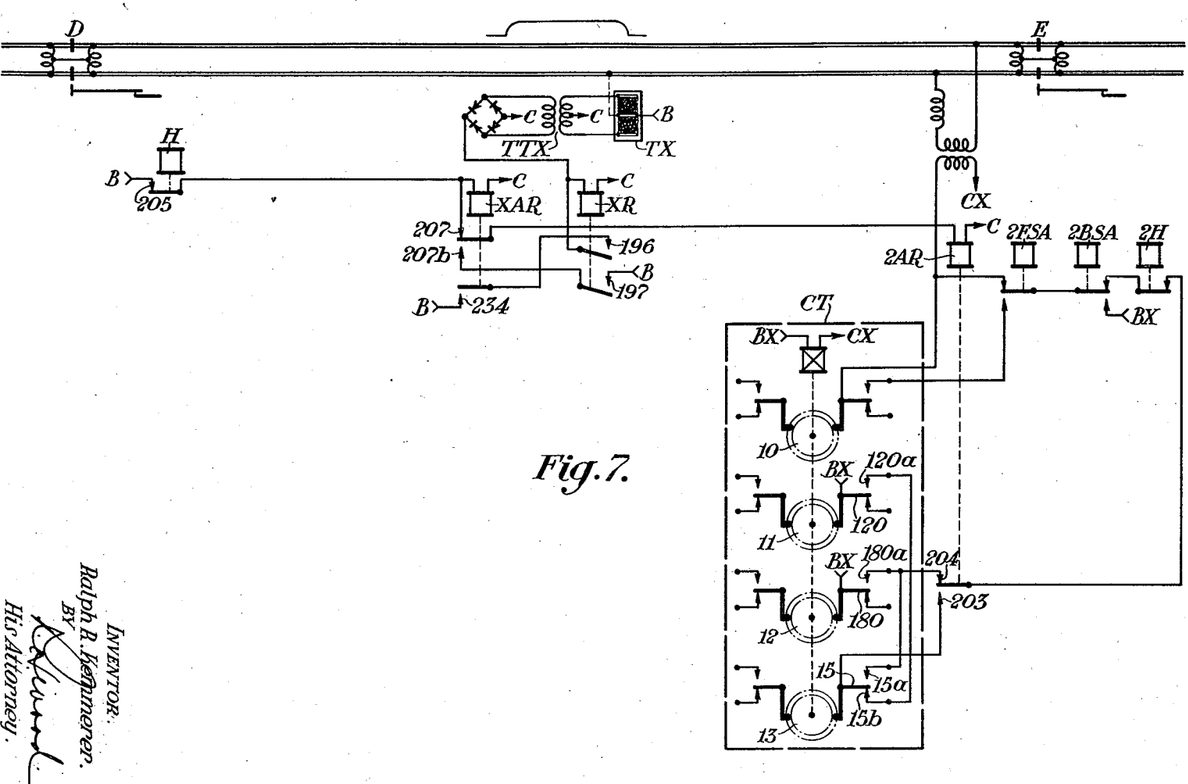
Fig. 7 is a diagrammatic view showing another modified form of the apparatus illustrated in Fig. 5, and also embodying my invention.

If, desired, other forms of apparatus may be employed to cut out or to start the combined or modulated codes which are supplied to the rails of section D—E by the apparatus illustrated in Figs. 1b, 4, 5 and 6. For example, Fig. 7 illustrates a track instrument TX of the well-known microphone type, operatively connected to a rail of section D—E at the point defining the limit of the restrictive speed zone and utilized to cut out the supply of the combined code and to start the supply of the normal code to the rails of section D—E. As shown, instrument TX controls the supply of energy to the primary winding of a transformer TTX, which transformer has its secondary winding connected through a full-wave rectifier to the winding of a relay XR. Normally, relay XR is released since the magnitude of current supplied through instrument TX to the primary winding of transformer TTX is constant. However, whenever a train section D—E approaches instrument TX and causes it to vibrate, the magnitude of current supplied through the instrument is varied in response to the actuation of the contacting elements in the instrument, and an electromotive force is induced in the secondary winding of transformer TTX in response to the current variations in the transformer primary winding. This induced electromotive force is rectified into and is supplied to relay XR as unidirectional energy to pick up such relay, and when relay XR picks up, it is held up over an obvious stick circuit which extends from terminal B through back contact 234 of relay XAR, front contact 196 and the winding of relay XR to terminal C.

Normally, the apparatus shown in Fig. 7 is in the condition illustrated in the drawings, wherein approach control relay 2AR is energized over an obvious circuit including front contact 205 of relay H of section D—E and front contact 297 of relay XAR. In this condition of the apparatus, the rails of section D—E are supplied with 180 code under clear traffic conditions in advance, over an obvious circuit which includes contact 180—180a of coder CT and front contact 204 of relay 2AR.

Whenever a train enters section D—E to cause relay H to release, relays XAR and 2AR are also released and relay 2AR closes its back contact 293 to condition the apparatus of Fig. 7 to supply combined 180—120 code to the rails of section D—E over circuits similar to those pointed out in detail in connection with the apparatus illustrated in Fig. 5. This combined code is supplied to section D—E until such time as the actuation of instrument TX causes relay XR to pick up. When relay XR picks up, its previously traced stick circuit is completed at back contact 234 of relay XAR (which released in response to the release of relay H), and relay XR also completes an alternate energizing circuit for relay 2AR, which circuit may be traced from terminal B through front contact 197 of relay XR, back contact 297b of relay XAR and the winding of relay 2AR to terminal C. Relay 2AR accordingly picks up to close its front contact 294 and thus condition the apparatus to supply the rails of section D—E with 180 code.

When the train vacates section D—E, relay H of section D—E becomes reenergized and picks up to in turn cause relay XAR to pick up. The picking up of relay XAR opens the previously traced stick circuit of relay XR to release that relay, and also completes the previously mentioned circuit over which relay 2AR is held normally energized.

From the foregoing descriptions of the operation of the apparatus represented in Figs. 1a, 1b, 2, 3, 4, 5, 6 and 7, it is readily apparent that I have provided novel and improved means whereby the code supplied to the rails of a section may be changed or altered in accordance with traffic conditions in the section or in certain portions of the section. It is further apparent that I have provided means for supplying and for utilizing a combined code formed by coding energy alternately at first one and then another of two distinctive code rates, and which energy may be utilized to expand the number of controls effected by the trackway energy without increasing the number of individual rates of coding.

Figure 8:
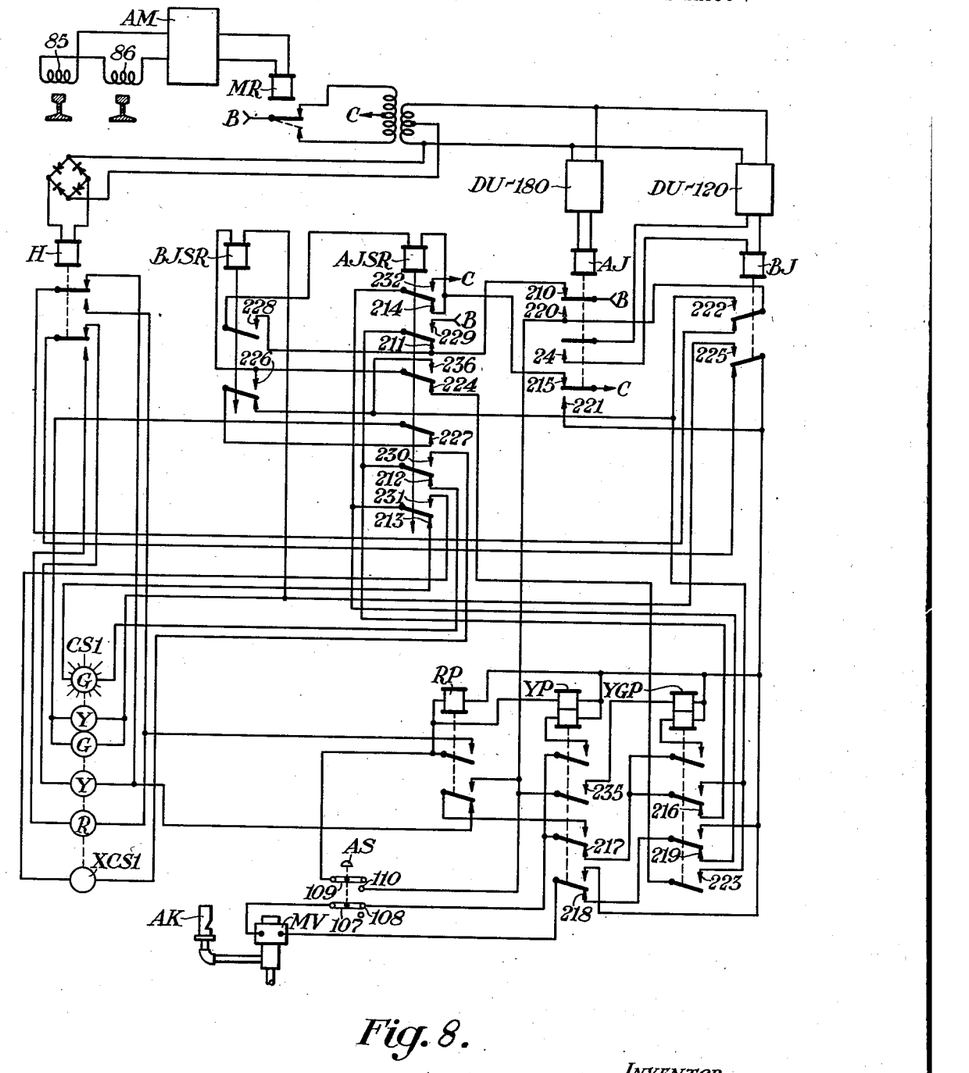
Fig. 8 is a diagrammatic view which illustrates a preferred form of train-carried apparatus adapted for use in connection with the wayside apparatus represented in Figs. 1a, 1b, 2, 3, 4, 5 and 6, and also embodying my invention.

In connection with the various schemes just referred to for supplying the rails of a section with trackway energy which is coded at one or another of a plurality of different rates of coding or which is formed into a code combination of such rates according as a train occupies a restrictive speed zone or an unrestrictive speed zone in such section, I propose to provide novel and improved train-carried cab signal apparatus selectively responsive to each of the various codes of trackway energy supplied to the rails and received by the train. A preferred embodiment of such novel apparatus is illustrated in Fig. 8, wherein is shown the customary cab signal equipment of the type shown and described in United States Letters Patent No. 1,986,679 granted to L. V. Lewis on January 1, 1935, the apparatus shown in the patent for providing a distinctive indication for each of three individual code rates being modified in accordance with my invention to provide a distinctive indication whenever such apparatus responds to two of such code rates repeated alternately.

Referring now to Fig. 8, the train-carried apparatus there represented includes the usual receiving apparatus comprising the coils 85 and 86, amplifier AM and master relay MR, the decoding relays H, AJ and BJ, the cab signal CS1, the acknowledging indicator AK and switch AS, and the acknowledging relays YGP, YP and RP. In addition to the above-mentioned customary apparatus, there are provided two slow releasing relays BJSR and AJSR each having a slow release period slightly longer than two seconds in duration, and indicator CS1 is provided with an extra distinctive indication unit XCS1. Also, the circuit for energizing relay BJ is carried over a back contact 24 of relay AJ, thereby insuring that relay BJ is released when the master relay is responding to 180 code and relay AJ is picked up.

I shall describe in detail only the operation of modified portions of the cab signaling system embodying my invention since the usual and well-known operation of such apparatus forms no part of my present invention. In the present modification, when the train-carried master relay MR is responding to 180 code, relays H and AJ are picked up. This is the condition in which the apparatus is illustrated in Fig. 8, and in this condition, lamp G of indicator CS1 is illuminated over a circuit which extends from terminal B through front contact 210 of relay AJ, back contact 211 of relay AJSR, back contact 212 of relay AJSR, the filament of lamp G of signal CS1, back contact 213 of relay AJSR, back contact 214 of relay AJSR, and front contact 215 of relay AJ to terminal C. It should be noted that acknowledging magnet valve MV is energized in multiple with lamp G of signal CS1 over the above traced circuit, the multiple path for magnet MV leaving the main circuit at the heel of back contact 212 of relay AJSR to extend through back contact 216 of relay YGP, back contact 217 of relay YP, contact 108-107 of acknowledging switch AS, the winding of magnet valve MV, back contact 218 of relay YP, and back contact 219 of relay YGP to rejoin the main circuit at the heel of back contact 213 of relay AJSR.

In the event the train enters that portion of a section supplied with combined 180—120 code, during the first two-second interval that 180 code is received from the rails, lamp G of signal CS1 is held illuminated. However, during the next two-second interval that 120 code is received, relay AJ releases to interrupt the previously traced energizing circuit for lamp G of signal CS1 and magnet valve MV, whereupon indicator AK is caused to sound. The release of relay AJ completes over its back contact 24 a circuit over which relay BJ is picked up in response to master relay MR following 120 code. With relay BJ picked up, acknowledging switch AS may be operated to its reverse position whereupon relay RP becomes energized over a circuit passing from terminal B through back contact 220 of relay AJ, contact 110-109 of acknowledging switch AS, the winding of relay RP and back contact 221 of relay AJ to terminal C, and relays YP and YGP also pick up in multiple with relay RP, the circuit of relay YGP including a front contact 235 of relay YP. The picking up of relay YGP completes a circuit whereby relay BJSR is energized, this circuit passing from terminal B through back contact 220 of relay AJ, front contact 222 of relay BJ, front contact 223 of relay YGP, back contact 224 of relay AJSR, the winding of relay BJSR, front contact 225 of relay BJ and back contact 221 of relay AJ to terminal C. Signal CS1 also is caused to display its Y/G indication, due to the energization of unit Y/G of signal CS1 over a circuit path connected in the above traced circuit for relay BJSR in shunt with relay BJSR, this path leaving the traced circuit at front contact 226 of relay BJSR and passing through back contact 227 of relay AJSR and the filaments of indication Y/G of signal CS1 to rejoin the circuit previously traced for relay BJSR, at a point intermediate the winding of relay BJSR and front contact 225 of relay BJ. Then, when the second interval of 180 code is received by the train-carried apparatus shown in Fig. 8, relay AJ picks up and relay BJ releases, thereby establishing an energizing circuit for relay AJSR, which circuit may be traced from terminal B through front contact 210 of relay AJ, front contact 228 of relay BJSR, the winding of relay AJSR and front contact 215 of relay AJ to terminal C. With both relays AJSR and BJSR picked up, the supplemental indication unit XCS1 becomes illuminated over a circuit passing from terminal B through front contact 229 of relay AJSR, front contact 230 of relay AJSR, the filament of signal unit XCS1, front contact 231 of relay AJSR and front contact 232 of relay AJSR to terminal C.

The acknowledging switch AS may now be restored to its normal position, thereby interrupting the previously mentioned energizing circuits for relays RP, YP and YGP, and establishing for magnet valve MV a circuit which extends from terminal B through front contact 229 of relay AJSR, back contact 216 of relay YGP, back contact 217 of relay YP, contact 108-107 of acknowledging switch AS, the winding of magnet valve MV, back contact 218 of relay YP, back contact 219 of relay YGP, and front contact 232 of relay AJSR to terminal C. The energization of magnet valve MV silences indicator AK.

As long as the train traverses the zone of track supplied with combined 180—120 code, relays AJ and BJ are alternately energized and deenergized for two-second intervals to thereby alternately energize relays BJSR and AJSR for similar intervals. Relay AJSR is energized over its previously traced circuit during each two-second interval that relay AJ is picked up when relay MR responds to 180 code; and such relay is held in its picked-up position by virtue of its slow releasing characteristics during the alternate two-second intervals that relay AJ is released in response to relay MR following 120 code. Relay AJSR accordingly is held continuously energized when relay MR responds to the combined 180—120 code, and as a result front contact 236 of relay AJSR is held closed to prepare a circuit for energizing relay BJSR. This circuit may be traced from terminal B through back contact 220 of relay AJ, front contact 222 of relay BJ, front contact 236 of relay AJSR, the winding of relay BJSR, front contact 225 of relay BJ, and back contact 221 of relay AJ to terminal C. It can be seen that the above traced circuit for relay BJSR is completed and relay BJSR is energized during each two-second interval that relay BJ is picked up in response to relay MR following 120 code; and that by virtue of its slow releasing characteristics relay BJSR is held in its picked-up position during the alternate two-second intervals that relay BJ is released in response to relay MR following 180 code. The relays AJSR and BJSR accordingly are held continuously in their picked-up conditions in response to the combined 180—120 code received from the trackway and it follows that such relays control indication unit XCS1 continuously to display an illuminated aspect in response to such combined code.

Then, when the train vacates the zone supplied with the combined code and master relay MR responds again to unmodulated 180 code, relay AJ is held steadily picked up and relay BJ releases. At the end of its two-second release interval, therefore, relay BJSR will release due to the interruption of its previously traced circuit, and with front contact 229 of relay BJSR opened, relay AJSR also will release. The apparatus accordingly is restored to the condition first described wherein a circuit is established for lamp G of signal CS1.

From the foregoing description of the apparatus of Fig. 8, it is readily apparent that I have provided novel and improved means wherewith a cab signaling apparatus arranged to provide a plurality of distinctive indications one for each of a plurality of different code rates may be arranged to provide additional indications in response to code combinations formed by two of such different rates repeated alternately. It further is apparent that means embodying my invention requires a minimum of apparatus to convert the customary cab equipment into one providing distinctive indications for combined codes. In addition, it can be seen that the cab signaling equipment embodying my invention can be utilized in its customary manner throughout the entire stretch to provide its usual traffic controlling indications, and that when an additional indication is required to be displayed to indicate a particular traffic condition peculiar to a portion of the stretch, such apparatus then is effective to display such additional indication.

Although I have herein shown and described only a few forms of railway traffic controlling apparatus embodying my invention, it is understood that various changes and modifications may be made therein within the scope of the appended claims without departing from the spirit and scope of my invention.

Having thus described my invention, what I claim is:

1. In combination, a section of railway track, means for supplying the rails of said section with trackway energy cyclically coded at first one and then another of two different rates of coding alternately, means responsive to traffic conditions in a selected portion of said section for supplying the rails of said section with trackway energy coded at but one of said two different rates of coding, a code responsive relay operated by energy received from the trackway, decoding means controlled by said code responsive relay and operative to detect each of said two different rates of coding, other means controlled by said code responsive relay for detecting operation of said relay by energy cyclically coded at said first one and then the other of said two different rates of coding, and railway traffic controlling apparatus selectively controlled by said decoding means and by said other means in accordance with the rate at which energy received from the trackway is coded.

2. In combination, a section of railway track, means for supplying the rails at one end of said section with trackway energy coded alternately at first one and then another of two different rates of coding, a code responsive relay operated by trackway energy received from the track rails at a selected point intermediate the two ends of said section, means controlled by said relay when shunted by a train in said section for supplying the track rails with trackway energy coded at but one of said two different rates of coding, a code responsive control relay operated by trackway energy received from the rails of said section, decoding means operated by said code responsive control relay and selectively responsive to each individual code rate and to said alternate coding of the trackway energy, and railway traffic controlling apparatus selectively controlled by said decoding means.

3. In combination, a section of railway track, means for supplying to the rails at one end of said section trackway energy coded alternately at first one and then another of two different rates of coding, a code responsive relay, means for bridging said relay across the track rails at a selected point intermediate the two ends of said section, an auxiliary relay, a transformer having its primary winding supplied with energy over contacts operated by said code responsive relay and supplying substantially unidirectional energy from its secondary winding to said auxiliary relay over a contact operated by said code responsive relay, means controlled by said auxiliary relay for supplying the track rails of said section with trackway energy which is coded at but one of said two different rates of coding, a code responsive control relay operated by energy received from the rails of said section, and railway traffic controlling apparatus selectively controlled by said control relay.

4. In combination, a section of railway track supplied at one end of the section with trackway energy coded at one or another of a plurality of distinctive rates of coding, a track relay connected across the track rails at a point intermediate the two ends of said section and operated by the trackway energy supplied at said one end of the section, means controlled by said track relay in response to trackway energy coded at a particular one of said rates of coding for supplying the rails of the remaining portion of said section with trackway energy coded alternately at first one and then another of two of such plurality of rates of coding, and means controlled by said track relay in response to trackway energy coded at rates other than said particular one rate for supplying to the rails of the remaining portion of said section trackway energy coded at a code rate corresponding to the rate of operation of said track relay.

5. In combination, a section of railway track, coding means controlled by traffic conditions in advance of said section for supplying to the track rails at one end of said section trackway energy coded at one or another of a plurality of code rates, a code responsive relay bridged across the track rails of said section at a selected point intermediate its two ends, an auxiliary relay controlled by said track relay, and means controlled by said auxiliary relay for altering the form of trackway energy supplied to the rails of said section, said last mentioned means being effective only in the event that traffic conditions in advance are such that said coding means is conditioned to supply trackway energy coded at a particular one of said plurality of code rates to the rails of said section.

6. In combination, a section of railway track, a source of energy for the track rails at one end of said section, coding apparatus having a plurality of circuit controlling contacts which operate at different rates, an auxiliary relay, a first circuit controlled by a front contact of said auxiliary relay for connecting said source to the track rails through a particular one of said circuit controlling contacts, other circuits one for each of the remaining circuit controlling contacts for connecting said source to the track rails through the associated circuit controlling contact, means for selectively rendering active one or another of said circuits, a code responsive relay, means for bridging said code responsive relay across the track rails at a selected point intermediate the two ends of said section, means controlled by said code responsive relay for energizing said auxiliary relay, means controlled by said auxiliary relay when released for modulating the energy supplied to the track rails through said particular one circuit controlling contact, and a code responsive control relay receiving energy from the rails of said section for selectively controlling traffic controlling apparatus in accordance with the rate at which such energy is coded.

7. In combination, a section of railway track supplied at one end of the section with trackway energy individually coded at one or another of a plurality of different code rates or alternately coded first at one of such code rates and then at another code rate, a code responsive track relay connected across the track rails at a point intermediate the two ends of said section and operated by the trackway energy supplied to said one end of the section, a source of current, a coding contact operated at a particular one of said different rates of coding, decoding means controlled by said track relay and selectively responsive to said alternately coded trackway energy for at times connecting said source to the track rails of the remaining portion of the section through said coding contact, and other means controlled by said decoding means for at other times connecting said source to the track rails over a contact operated by said track relay.

8. In combination, a section of railway track, means for supplying to the rails at one end of the section trackway energy coded at one or another of a plurality of different rates of coding, a relay responsive to energy received from the track rails at the other end of said section, a track instrument operatively associated with the track rails at a selected point intermediate the two ends of said section, and means jointly controlled by said relay and by said track instrument for controlling the code rate at which energy supplied to the rails of said section is coded.

9. In combination, a section of railway track having means for supplying to the rails of said section trackway energy coded at any one of a plurality of rates individually or at a combination of two of such rates alternately, means responsive to traffic conditions in a selected portion of said section for conditioning said first mentioned means at times to supply to the track rails current coded at an individual code rate and at other times to supply current coded at said combination of code rates, a train to travel said section, and train-carried apparatus on said train comprising a code responsive relay receiving energy from the rails of said section, a first decoding relay selectively operated by said code responsive relay in response to energy coded at a first of said rates of coding, a second decoding relay selectively operated by said code responsive relay in response to energy coded at a second of said rates of coding, a first slow releasing relay for said first decoding relay, a pick-up circuit for said first slow releasing relay including a front contact of said first decoding relay, a second slow releasing relay for said second decoding relay, means controlled by said first and second decoding relays for energizing said second slow releasing relay over a circuit including a front contact of said first slow releasing relay and for energizing said first slow releasing relay over a circuit including a front contact of said second slow releasing relay, said last mentioned means being effective when and only when said first and said second decoding relays are alternately picked up and released for substantially uniform intervals of time in response to the operation of said code responsive relay by energy which is coded for substantially uniform intervals of time at said first and then at said second rate of coding alternately, and railway traffic controlling apparatus selectively controlled by said decoding relays and by said slow releasing relays.

10. In combination, a section of railway track having means for supplying to the rails of said section trackway energy coded at any one of a plurality of rates individually or at a combination of two of such rates alternately, means responsive to traffic conditions in a selected portion of said section for conditioning said first mentioned means at times to supply to the track rails current coded at an individual code rate and at other times to supply current coded at said combination of code rates, a train to travel said section, and train-carried apparatus on said train comprising a code responsive relay receiving energy from the rails of said section and selectively energizing one or another of two decoding relays according as said code responsive relay is operated by energy coded at a first or a second of said plurality of rates of coding, two slow releasing relays one for each of said two decoding relays, a pick-up circuit for one of said slow releasing relays including a front contact of the associated decoding relay, an energizing circuit for the other of said slow releasing relays including a front contact of the other of said decoding relays and a front contact of said one slow releasing relay, whereby to energize first one and then the other of said two slow releasing relays when said code responsive relay is operated by energy cyclically coded alternately first at said one and then at said other rate of coding, the slow releasing characteristics of said two slow releasing relays being so proportioned that such relays are held constantly picked up when said code responsive relay responds to such alternately coded energy, and railway traffic controlling apparatus selectively controlled by said two decoding relays and by said two slow releasing relays.

11. In combination, a code responsive relay, a first decoding relay selectively operated by said code responsive relay in response to energy coded at a first rate of coding, a second decoding relay selectively operated by said code responsive relay in response to energy coded at a second rate of coding, a first slow releasing relay for said first decoding relay, a second slow releasing relay for said second decoding relay, means controlled by said first and second decoding relays for energizing said first slow releasing relay over a front contact of said second slow releasing relay and said second slow releasing relay over a front contact of said first slow releasing relay when and only when said first and said second decoding relays are alternately picked up and released for substantially uniform intervals of time in response to the operation of said code responsive relay by energy which is coded for substantially uniform intervals of time at said first and then at said second rate of coding alternately, and railway traffic controlling apparatus selectively controlled by said decoding relays and by said slow releasing relays.

12. In combination with a code responsive relay and means for selectively energizing one or another of two decoding relays according as said code responsive relay is operated by energy coded at one or another of two different rates of coding, two slow releasing relays one for each of said two decoding relays, an auxiliary relay for one of said decoding relays, means for energizing said auxiliary relay when said one decoding relay is energized, a pick-up circuit for one of said slow releasing relays including a front contact of said auxiliary relay and a front contact of said one decoding relay, means for energizing the other of said slow releasing relays over a circuit including a front contact of the other of said decoding relays and a front contact of said one slow releasing relay and for energizing said one slow releasing relay over a circuit including a front contact of said one decoding relay and a front contact of said other slow releasing relay, whereby to energize first said one and then said other of said two slow releasing relays when said code responsive relay is operated by energy cyclically coded alternately first at said one and then at said other rate of coding, the slow releasing characteristics of said two slow releasing relays being so proportioned that such relays are held constantly picked up when said code responsive relay responds to such alternately coded energy, and railway traffic controlling apparatus selectively controlled by said two decoding relays and by said two slow releasing relays.

RALPH R. KEMMERER.